May 21, 1935.  M. R. TREMBOUR ET AL  2,002,229
PROCESS OF MANUFACTURING COMPOSITE METAL ARTICLES
Filed April 11, 1932
Fig. Ia.
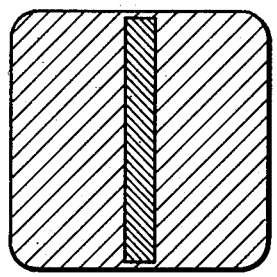
Fig. Ib.
Fig. Ic.
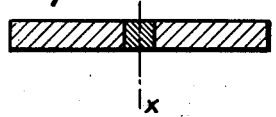
Fig. Id.
Fig. IIa.
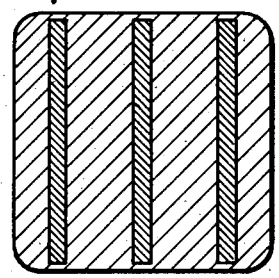
Fig. IIb.
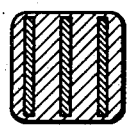
Fig. IIc.
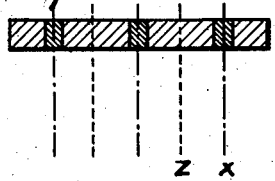
Fig. IId.
WITNESSES
A.B.Wallace.
J.B.Flick
INVENTOR
Max R. Trembour
by
Brown, Critchlow & Flick
his attorneys.

Patented May 21, 1935

2,002,229

UNITED STATES PATENT OFFICE 2,002,229

PROCESS OF MANUFACTURING COMPOSITE METAL ARTICLES

Max R. Trembour, Beaver, and Harry Wilson, Jr., Washington, Pa., assignors, by direct and mesne assignments, to Jessop Steel Company Washington, Pa., a corporation of Pennsylvania Application April 11, 1932, Serial No. 604,646

3 Claims. (Cl. 29—188)

These improvements relate to the manufacture of bimetallic products, such as bars, sheets, bands or strips, and tools and implements made therefrom, in which two different metals or two different types of the same metal are permanently joined together in such a way that the main body of the article is composed of an ordinary cheap metal, such as common steel, while the working edge, -face or -side of the article consists of some high-grade, more expensive and usually harder metal or alloy, such as high carbon—high chrome steel, high speed steel and other special steels and alloys of a similar nature.

The process is particularly adapted to the manufacture of bimetallic products, in which the ductility of the two components at elevated temperatures, such as prevailing during the rolling and welding operations, is sufficiently different to cause one metal to flow more freely than the other.

We have found that, when such a condition exists, it is desirable to modify the method of manufacturing the bimetallic ingot and of welding the component metals and rolling to the desired shape, as described in a correlated application, Serial Number 591,816, of February 2, 1932, and to proceed as set forth below.

We found that, when the ductility or plasticity of one component is at the rolling and welding temperature considerably greater than that of the other, for instance in the case of a composite ingot consisting principally of soft or medium hard ordinary steel and having a high speed steel insert, and if such an insert is located on one side or in one corner of the ingot, the elongation of the two metals in rolling may not be proportional, the insert may break up, the welding may not be satisfactory and it may be difficult to prevent the billet or bar from curving in the rolls.

The invention may be described in connection with the accompanying drawing, in which Fig. 1a represents a cross section of an ingot made in accordance with this invention, using a single centrally located insert; Figs. 1b and 1c sections, respectively, of a billet rolled from the ingot shown in Fig. 1a, and a flat bar, or strip, rolled from the billet; Fig. 1d the strip shown in Fig. 1c after having been slit through the center of the insert; Figs. 2a to 2d cross sectional views similar to Figs. 1a to 1d showing another embodiment of the invention.

We have found that, in order to prevent these difficulties, it is necessary to arrange for a symmetrical distribution of the inserts within the softer metal and to carry out the welding and forming operations without disturbing the symmetry of the arrangement of the plies. Therefore, instead of arranging a single insert near one corner or one side of the ingot as shown in Fig. 1a, as described in the aforesaid correlated application, we locate this insert centrally in the ingot, and, as shown in Fig. 2a in the case of several inserts, they are symmetrically distributed within the softer metal, the latter completely surrounding and enveloping the former, as described in the aforesaid application.

In view of this latter circumstance and also in view of the fact that in the finished product the insert material must be exposed on the surface, we have developed the following method of procedure as especially suitable for the production of strips and other thin sections, where as a rule three sides of the original insert are fully exposed on the surface, while only one side is welded to the soft metal backing.

As described in the aforesaid correlated application, two sides of the insert or inserts are located close to the surface of the ingot, so that they are covered only by a relatively thin layer of soft metal, but as there described the two sides are adjoining and located in one corner or on one side of the ingot. In the practice of the present invention, and as shown in Fig. 1a, the insert is positioned symmetrically in the ingot with two of its opposite sides facing and close to the adjacent sides of the ingot, so that they are close to the surface of the ingot and are covered with a thin layer of the soft metal, the other two faces of the insert being covered with a heavy section of the soft metal. Since the ingot is, as a rule, of a square cross section, it follows that the inserts will, as a rule consist of flat bars or billets, the narrow sides of which are covered by only a thin layer of the softer metal.

The ingot is then rolled in such a way as to preserve the symmetry of the insert arrangement and, after reduction to a billet of suitable size, as indicated in Fig. 1b, and after completion of the welding of the component parts by such rolling, the resulting billet is finally reduced to a flat section, as shown in Fig. 1c, in such a way that the two sides of the insert or inserts, which in the ingot were only lightly covered by the softer metal, are parallel to the wide sides of the flat section, and are now located directly under these surfaces, covered only by a very light layer of soft metal.

This layer may now be ground off or otherwise removed from the nearly finished article, or the latter may be hot- or cold-rolled to the desired final gage and the film of soft metal may be removed later during the conversion of the article into the finished tool.

After completing the rolling to the desired thickness or gage, the material is annealed and the annealed flat bar, sheet, band or strip is then sheared, cut or slit in such a way that the cuts run centrally through the insert or inserts, e. g., along the broken line X—X, Fig. 1c, producing the two parts shown in Fig. 1d, thereby exposing for the first time an edge of the insert material. The soft steel backing may then be trimmed to requirements.

It is obvious that, instead of one or three inserts as illustrated, two, four or more may be used. Such an embodiment is illustrated in Figs. 2a to 2d. In this embodiment three inserts are disposed symmetrically with respect to the ingot section, and each of these inserts has two of its opposite sides close to but covered by the adjacent surfaces of the ingot, its other two faces being covered with a heavy section of the cast metal. As described in connection with the preceding embodiment, and as shown in Figs. 2b to 2d, the ingot is rolled to form a billet, and the latter is then transformed into a strip which is cut longitudinally through the inserts, e. g., along the broken line X—X, Fig. 2c, and through the intermediate cast metal, e. g., along the chain line Z—Z, Fig. 2c, to thereby form six strips each composed of a body of cheap metal having welded thereto a facing of special metal.

Having described our invention we claim:

1. The process of making bimetallic tool stock and the like having an edge of tool steel welded to and backed by a body of mild steel, comprising supporting an insert of tool steel symmetrically in an ingot mold of flat section with two of its opposed sides adjacent to but out of contact with the wide sides of the mold, casting mild steel around said insert to completely envelop it and form a composite ingot in which said insert sides are covered by a light section, and the other two faces of the insert with a heavy section, of mild steel, hot-rolling the ingot to weld said insert to said mild steel and to form a square billet, rolling further to convert said billet to a plate whose wide face is approximately twice that of the stock desired, the sides of the billet corresponding to said lightly covered insert sides becoming the wide faces of the plate, and cutting the plate longitudinally through the center of the insert.

2. The process of making bimetallic tool stock and the like having an edge of tool steel welded to and backed by a body of mild steel, comprising supporting at least one preformed and cleaned insert of tool steel symmetrically in an ingot mold of flat section with the opposed narrow insert sides adjacent to but out of contact with two opposed sides of the mold, casting mild steel around said insert to completely envelop it and form a composite ingot in which said narrow insert sides are covered by a light section, and the other two faces of the insert with a heavy section, of mild steel, hot-rolling the ingot to weld said insert to said mild steel and to form a square billet, rolling further to convert said billet to a plate whose wide face is a multiple of the width of the stock desired, the sides of the billet corresponding to said lightly covered insert sides becoming the wide faces of said plate, and cutting the plate longitudinally through the center of the insert or inserts.

3. The process of making bimetallic tool stock and the like having an edge of tool steel welded to and backed by a body of mild steel, comprising supporting at least one preformed and cleaned insert of tool steel symmetrically in an ingot mold of square section with the opposed narrow insert sides adjacent to but out of contact with two opposed sides of the mold, casting mild steel around said insert to completely envelop it and form a composite ingot in which said narrow insert sides are covered by a light section, and the other two faces of the insert with a heavy section, of mild steel, hot-rolling the square section ingot to weld said insert to said mild steel and to form a square billet, rolling further to convert said billet to a plate whose wide face is a multiple of the width of the stock desired, the sides of the billet corresponding to said lightly covered insert sides becoming the wide faces of said plate, and cutting the plate longitudinally through the center of the insert or inserts.

MAX R. TREMBOUR.
HARRY WILSON, Jr.